United States Patent
Ziegler, Jr.

[11] Patent Number: 5,867,976
[45] Date of Patent: Feb. 9, 1999

[54] SELF-RETAINED BORESCOPE PLUG

[75] Inventor: Edwin E. Ziegler, Jr., Reading, Mass.

[73] Assignee: General Electric Company, Cincinnati, Ohio

[21] Appl. No.: 905,028

[22] Filed: Aug. 1, 1997

[51] Int. Cl.$^6$ .................................................. F02C 7/00
[52] U.S. Cl. .......................................... 60/39.33; 415/118
[58] Field of Search ........................... 60/39.33; 356/241; 403/361; 411/999; 415/118, 201

[56] References Cited

U.S. PATENT DOCUMENTS

| | | | |
|---|---|---|---|
| 2,965,286 | 12/1960 | Ledwith et al. | 415/201 |
| 3,362,160 | 1/1968 | Bourgeois | 415/118 |
| 4,300,774 | 11/1981 | Hollis et al. | 60/39.75 |
| 4,815,276 | 3/1989 | Hansel et al. | 60/39.33 |
| 4,825,642 | 5/1989 | Radtke | 60/39.33 |
| 5,115,636 | 5/1992 | Zeiser | 60/39.33 |
| 5,431,534 | 7/1995 | Charbonnel | 60/39.33 |

Primary Examiner—Louis J. Casaregola
Attorney, Agent, or Firm—Andrew C. Hess; David L. Narciso

[57] ABSTRACT

A borescope plug apparatus includes a plug having a threaded inner end for threadingly engaging a borescope port in an inner casing, and an opposite outer end. A tubular sleeve surrounds the plug to define an annulus therebetween, and has opposite inner and outer open ends. A first retainer is operatively joined to the sleeve outer end for mounting the sleeve to an outer casing. A second retainer is operatively joined between the sleeve and the plug for retaining the plug inside the sleeve upon disengagement between the plug inner end and the borescope port.

10 Claims, 5 Drawing Sheets

SELF-RETAINED BORESCOPE PLUG

The U.S. Government has rights in this invention in accordance with Contract No. N0001995-C-0129 awarded by the Department of the Navy.

BACKGROUND OF THE INVENTION

The present invention relates generally to gas turbine engines, and, more specifically, to borescope plugs therein.

In a bypass turbofan gas turbine engine, a core engine is spaced radially inwardly from an outer casing to define a bypass duct therebetween. The core engine includes its own casing, the inner casing, and powers a fan which bypasses a portion of pressurized air therefrom through the bypass duct and over the inner casing surrounding the core engine.

The core engine includes a multi-stage axial flow compressor which further pressurizes the air received from the fan, which is then discharged through a diffuser into a combustor wherein it is mixed with fuel and ignited for generating hot combustion gases which flow downstream through corresponding high and low pressure turbines, which in turn power the compressor and fan, respectively.

In order to periodically inspect the condition of the internal parts of the engine, such as the combustor and compressor and turbine blades and vanes, borescope ports are provided in the engine casings and frames. Through these ports optical borescope instruments can be inserted into the core engine to enable visual observation of the condition of internal engine parts from outside the engine, without having to disassemble the engine.

Borescope plugs are used to close and seal these ports to prevent high pressure, high temperature engine gases from escaping therethrough during engine operation. The borescope plugs are threaded into tapped bosses in the core engine casings. The plugs are torqued tightly into the bosses, and the resultant preload and friction force prevents the plug from unthreading, and becoming loose. Thus, the borescope plug is fixed to the core engine casing.

In general, as the engine approaches operating temperature and pressure, the core engine casings expand more than the outer casing in both radial and axial directions due to the differences in temperatures and materials. In addition, the vibration amplitude and frequency response of the core engine casings and the outer casing will be different. For these reasons, the borescope plug must be free to move axially, radially, and circumferentially, relative to the outer engine casing.

To prevent excessive leakage of the bypass duct air through the outer casing, a floating seal is used around the borescope plug where it penetrates the outer casing. In a typical embodiment, the seal is a flat washer which has a close fit with the borescope plug. This washer is secured to the outside of the outer casing by means of a retainer plate which has a recess to contain the floating seal washer, yet allows it to move freely in axial and circumferential directions.

If the borescope plug is not properly torqued during assembly, it may subsequently loosen and be ejected from the engine during operation. In the case of a compressor borescope plug, the compressed air is relatively hot and is expelled as a jet through the borescope port, and not only adversely affects engine performance, but may cause heat damage to impacted components. For example, the outer casing may be formed of a conventional composite material having a lower operating temperature than that of metal casings. Impinging hot leakage flow may therefore degrade the composite material of the outer casing causing excessive damage thereto requiring complete replacement thereof.

Accordingly, it is desired to provide a self-retained borescope plug for accommodating inadvertent disconnection of the plug from its mounting boss.

SUMMARY OF THE INVENTION

A borescope plug apparatus includes a plug having a threaded inner end for threadingly engaging a borescope port in an inner casing, and an opposite outer end. A tubular sleeve surrounds the plug to define an annulus therebetween, and has opposite inner and outer open ends. A first retainer is operatively joined to the sleeve outer end for mounting the sleeve to an outer casing. A second retainer is operatively joined between the sleeve and the plug for retaining the plug inside the sleeve upon disengagement between the plug inner end and the borescope port.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
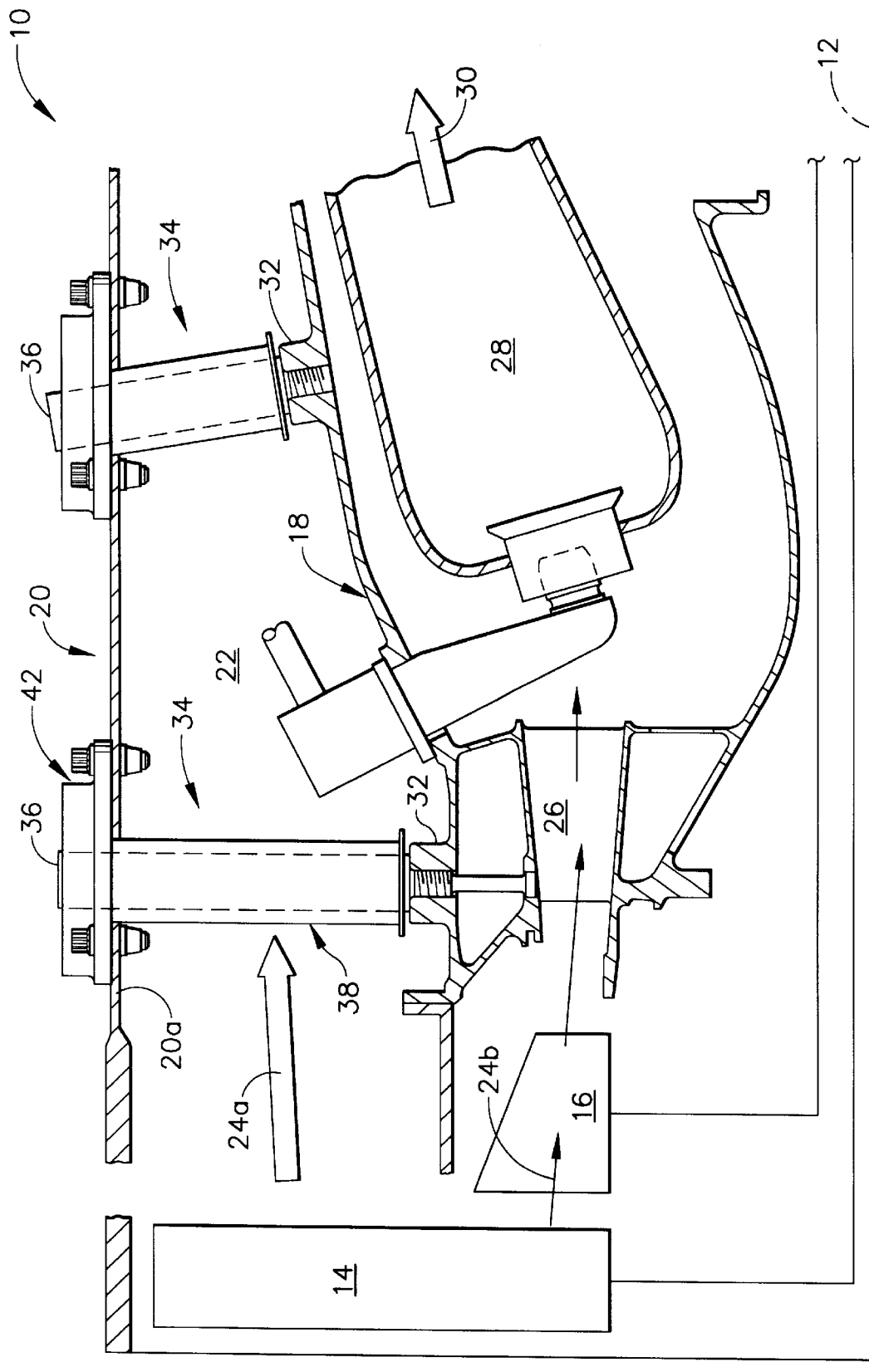
FIG. 1 is a partly sectional and schematic axial view of a portion of a gas turbine engine having a borescope plug apparatus extending between inner and outer casings in accordance with an exemplary embodiment of the present invention.

Illustrated schematically in FIG. 1 is a portion of an aircraft turbofan gas turbine engine 10 which is axisymmetrical about a centerline axial axis 12. The engine 10 may have any conventional form including a fan 14 and multi-stage axial compressor 16 which are correspondingly powered by low pressure and high pressure turbines (not shown). The compressor 16 is part of a core engine surrounded by a core engine casing shown in relevant part and referred to herein as an inner casing 18. Disposed coaxially with the inner casing 18 and spaced radially outwardly therefrom is a generally concentric annular outer casing 20 between which is defined an annular bypass duct 22.

Ambient air flowing past the fan 14 is split into a radially outer portion defining bypass duct air 24a, and a radially inner portion defining core air 24b which is further compressed in the compressor 16 and diffused in a conventional diffuser 26 inside the inner casing 18. The pressurized core air 24b then flows to an annular combustor 28 wherein it is mixed with fuel from a suitable fuel injector and ignited for generating hot combustion gases 30 which flow downstream therefrom to the respective turbines which extract energy for powering the fan and compressor.

During operation, the various components of the engine 10 are subject to different operating temperatures and pressures. For example, the core air 24b in the diffuser 26 has a relatively high pressure and temperature, which in turn are greater than the pressure and temperature of the bypass air 24a in the bypass duct 22. And, the bypass air 24a has a higher pressure than that found outside the outer casing 20.

In order to visually inspect various components of the engine 10, it is conventionally known to provide suitable borescope bosses or ports 32 at various locations in the inner casing 18 through which a conventional borescope (not shown) may be inserted. The borescope ports 32 provide through passages into the diffuser 26 and combustor 28, for example, for visually inspecting surfaces thereof.

The borescope ports 32 have internal threads for not only mounting the borescope thereto, but for also being suitably plugged in accordance with the present invention to prevent escape therefrom of hot pressurized fluids such as the core air 24b and combustion gases 30.

In accordance with the present invention, a self-retained borescope plug assembly or apparatus 34 may be suitably configured for plugging the various borescope ports 32 to seal and prevent fluid escape therefrom, while providing self-retention in the event of inadvertent unthreading or disengagement from the borescope ports 32 due to inadequate initial torquing, for example. FIG. 1 illustrates two similar forms of the borescope apparatus 34 for the corresponding ports 32 at the diffuser 26 and the combustor 28.

Figure 2:
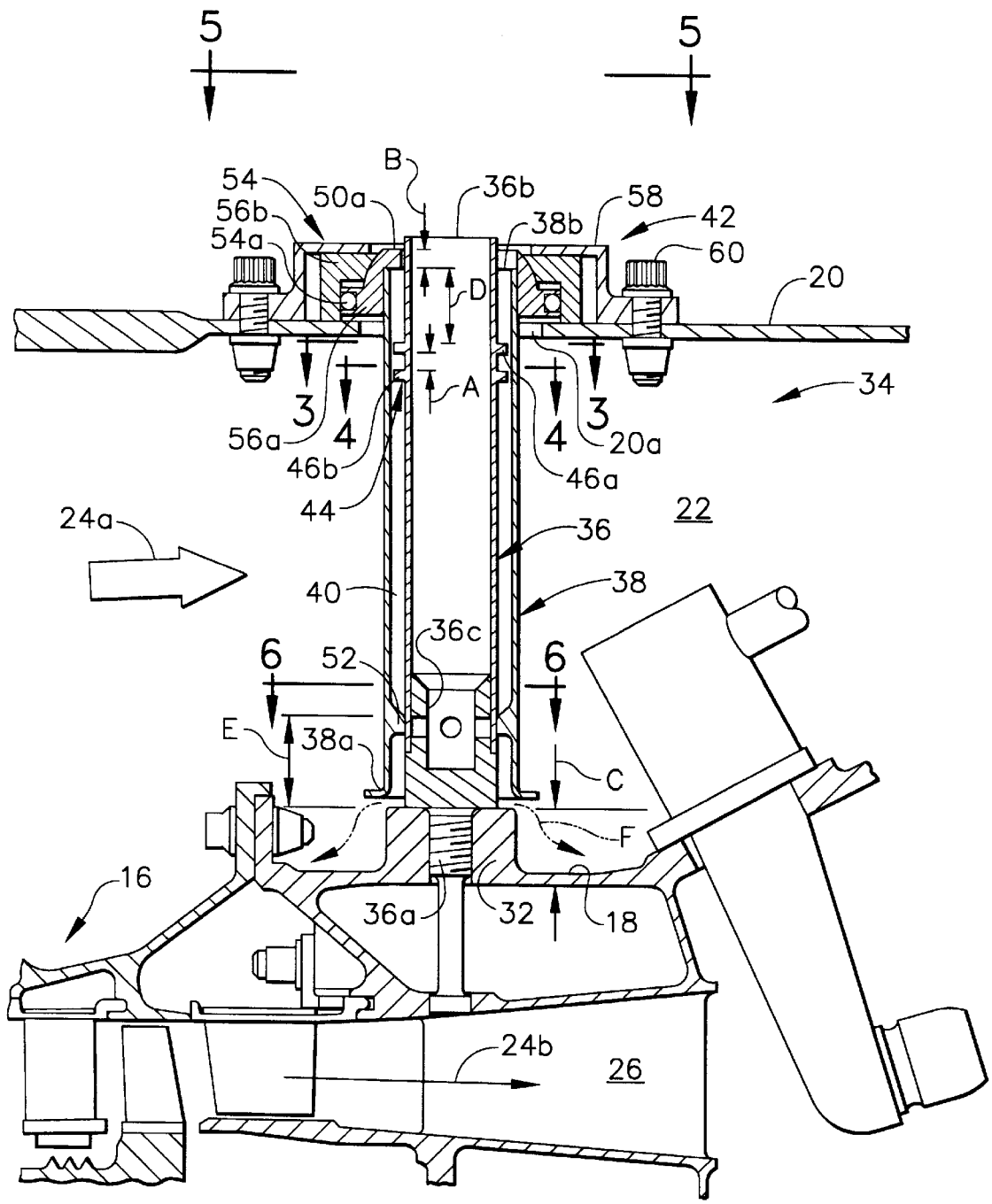
FIG. 2 is an enlarged elevational view of the borescope plug apparatus illustrated in FIG. 1 between the outer casing and the inner casing at a compressor diffuser.

FIG. 2 illustrates in more particularity the borescope apparatus 34 for the diffuser 26. The apparatus 34 includes a borescope plug 36 having a threaded radial inner end 36a for threadingly engaging the borescope port 32 for providing a seal thereat. In the exemplary embodiment illustrated in FIG. 2, the inner end 36a has an extension into a corresponding hole in the outer band of the diffuser 26 in a conventional configuration. The plug 36 also includes an opposite, radially outer tubular outer end 36b preferably having an imperforate sidewall. But for the present invention as described in further detail hereinbelow, the plug 36 may have any conventional form including an internal, square wrench socket 36c recessed through the tubular plug outer end 36b just above the plug inner end 36a in which a conventional wrench (not shown) may be installed for suitably torquing the plug 36 into sealing engagement with the port 32.

The plug 36 has a suitable length in the radial direction relative to the engine centerline axis 12 to extend from the port 32, across the bypass duct 22 and outwardly through an access port 20a through the outer casing 20. An imperforate tubular sleeve 38 surrounds the plug 36 coaxially or concentrically therearound to define an annulus 40 therebetween. The sleeve 38 has radially opposite inner and outer open ends 38a and 38b. The inner end 38a is disposed at the borescope port 32, and the outer end 38b extends outwardly through the access port 20a.

Means in the form of a first retainer 42 are operatively joined to the sleeve outer end 38b for retaining or mounting the sleeve 38 to the outer casing 20 through the access port 20a. The first retainer 42 is preferably an assembly of components which supports the sleeve 38 only at its radially outer end in a cantilever manner and allows suitable floating in the axial and circumferential directions between the sleeve 38 and outer casing 20 for accommodating differential movements therebetween during operation.

Means in the form of a second retainer 44 are operatively joined between the sleeve 38 at its outer end 38b and the plug 36 at an intermediate portion thereof for retaining the plug 36 inside the sleeve 38 upon disengagement or unthreading between the plug inner end 36a and the borescope port 32. The second retainer 44 is configured for allowing a limited amount of radial movement of the plug 36 in the sleeve 38 for allowing assembly and disassembly thereof, and for accommodating differential radial movement between the plug 36 when attached to the borescope port 32, and the outer casing 20 during operation.

The sleeve 38 and first and second retainers 42, 44 provide a retention device for the plug 36 in the event of inadvertent separation between the plug and its borescope port 32 during operation, while also allowing differential radial, axial, and circumferential movement between the plug 36 and the outer casing 20 during operation. In the event of plug separation from the port 32, the pressurized core air 24b ejected out of the borescope plug 32 will be channeled radially outwardly through the inside of the sleeve 38 and out the access port 20a for protecting the inner surface of the outer casing 20 against the hot temperature thereof. In this way, the outer casing 20 may be formed of a suitable composite material which is thereby protected from the hot temperature of the escaping core air 24b by being channeled through the sleeve 38.

Figure 3:
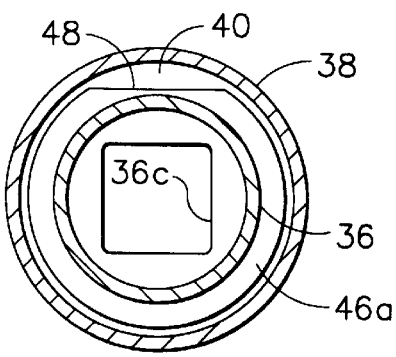
FIG. 3 is a radial sectional view through the borescope plug and surrounding sleeve illustrated in FIG. 2 and taken along line 3—3.

The second retainer 44 for the plug 46 preferably includes one or more bands 46a,b radially or fixedly joined around the plug 36 near its outer end, which extend radially outwardly at least in part around the plug 36 relative to its centerline axis and across the annulus 40. In the exemplary embodiment illustrated in FIG. 2, first and second bands 46a,b are preferred and are longitudinally spaced apart from each other at a band spacing A. Each band 46a,b is illustrated in more particularity in FIGS. 3 and 4, and is preferably annular in part in the form of a D-shaped ring with a respective chordal flat 48 at different angular positions therebetween. For example, the flat 48 on the first, or outer, band 46a illustrated in FIG. 3 is disposed on one side of the plug 36, with the flat 48 of the second, or inner, band 46b being disposed on the diametrically opposite side of the plug 36, with the two flats 48 being aligned parallel to each other. In this way, the bands 46a,b substantially obstruct the annulus 40 between the plug 36 and sleeve 38 except at the two flats 48.

Referring again to FIG. 2, the second retainer 44 further includes a first lip 50a fixedly joined to the sleeve outer end 38b which extends radially inwardly from the sleeve 36 into and across the annulus 40 for longitudinally engaging in abutment the plug bands 46a,b to restrain or prevent ejection of the plug 36 through the sleeve 38 upon disengagement of the plug inner end 36a from the boss 32. The lip 50a is illustrated in more particularity in FIG. 5 and has a chordal configuration complementary to the chordal flats 48, illustrated in FIGS. 3 and 4, for allowing passage of the plug 36 therepast only when aligned therewith, and for obstructing passage thereof when unaligned therewith.

Figure 4:
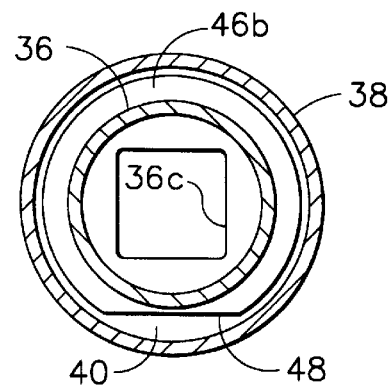
FIG. 4 is a radial sectional view through the borescope plug and surrounding sleeve illustrated in FIG. 2 and taken along line 4—4.
Figure 5:
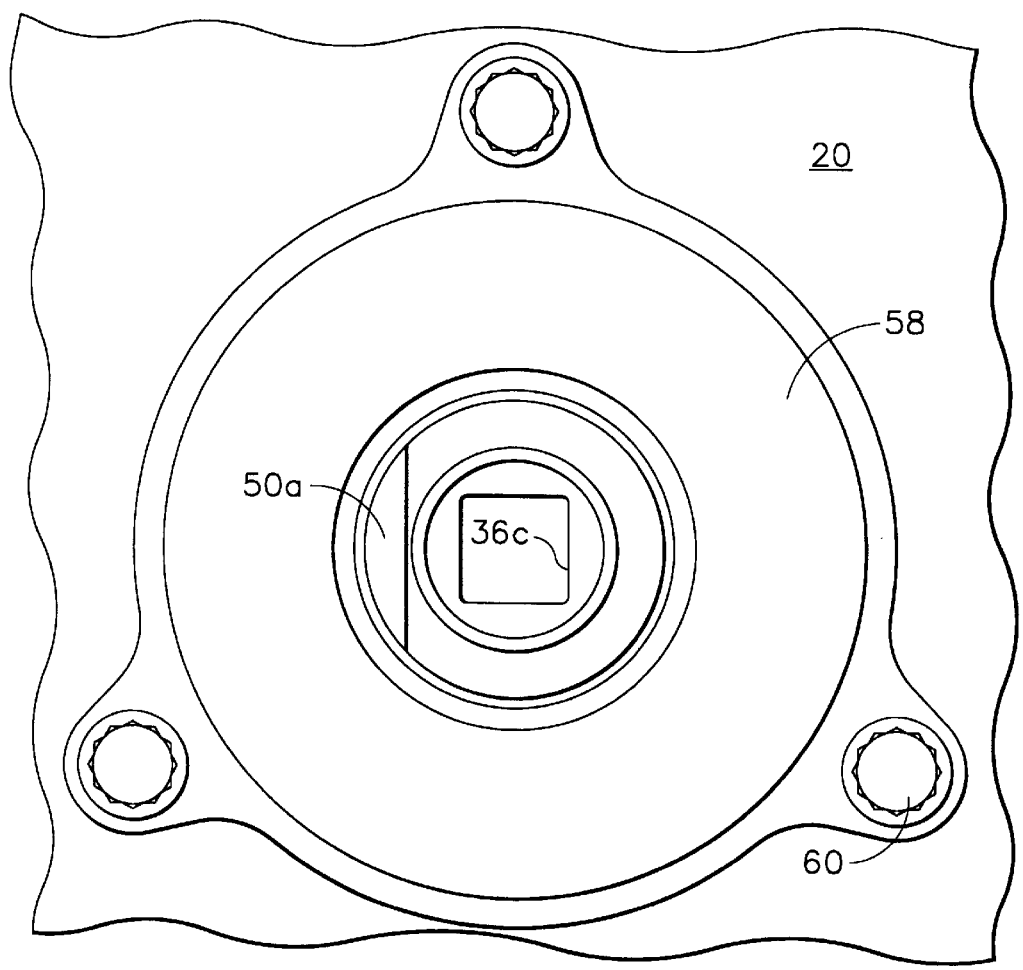
FIG. 5 is a top view of the borescope plug apparatus illustrated in FIG. 2 and taken along line 5—5.

For example, after assembly of the plug 36 into the boss 32, the flat 48 of the first band 46a as illustrated in FIG. 3 may be disposed at the 12:00 o'clock position, with the flat 48 of the second band 46b as shown in FIG. 4 being disposed at the 6:00 o'clock position. And, the lip 50a as illustrated in FIG. 5 is disposed at the 9:00 o'clock position. In this way, if the plug 36 becomes disengaged from the port 32, the annular portion of the first band 46a will radially abut the lip 50a preventing ejection of the plug 36 from the sleeve 38. The second band 46b provides redundant retention in the event that the plug 36 rotates to align the flat 48 with the lip 50a allowing movement therepast, after which the second band 46b will then engage the lip 50a preventing ejection of the plug 36.

In order to allow assembly and disassembly of the plug 36 within the sleeve 38, the lip 50a as illustrated in FIG. 2 has a thickness B, with the spacing A between the first and second bands 46a,b being suitably greater than the lip thickness B. This allows the plug 36 to be inserted through the sleeve outer end 38b past the lip 50a without obstruction until the second band 46b reaches the lip 50a. The plug 36 is suitably rotated for aligning the flat 48 of the second band 46b with the lip 50a so that the plug 36 may be further inserted radially inwardly in the sleeve 38, with the second band 46b clearing the lip 50a. The lip 50a is then disposed between the first and second bands 46a,b, and the plug 36 is again rotated so that the flat 48 of the first band 46a is aligned with the lip 50a for allowing its passage therepast without obstruction. The threaded plug inner end 36a is then suitably screwed into the borescope port 32 using a suitable wrench in the socket 36c, and suitably torqued into tight contact therein.

For disassembly, the plug 36 is simply unthreaded from the port 32 for disengagement therebetween and then suitably lifted radially outwardly. The plug inner end 36a has a suitable height C of threaded engagement with the borescope port 32, with the outer band 46a being spaced from the lip 50a at a suitable spacing D which is larger than the threaded height C so that the plug 36 may be unthreaded from the port 32 without engaging the outer band 46a against the lip 50a. The plug 36 is then rotated and lifted to clear, in turn, the two bands 46a,b past the lip 50a.

Upon inadvertent disengagement of the plug inner end 36a from the borescope port 32 during operation, the high pressure core air 24b will eject the plug 36 upwardly only in part in the sleeve 38 until the outer band 46a engages the lip 50a.

The inner seal 52 is preferably spaced from the top of the borescope port 32 at a distance E, which is suitably larger than the band-to-lip spacing D, so that upon engagement between the outer band 46a and the lip 50a the enlarged bottom of the borescope plug 36 above the threaded inner end 36a still engages the inner seal 52. The leaking core air is thereby captured and deflected by the sleeve 38 to prevent undesirable impingement of the hot core air against the inner surface of the outer casing 20. In this way, heat damage to the outer casing 20 may be reduced or eliminated in the event of a loosened, but retained plug. And, a secondary advantage is preventing hot air leakage through the outer casing into the engine bay where sensitive aircraft components may be found.

With the outer band 46a engaged against the lip 50a, the inner seal 52 will prevent air from escaping through the sleeve 38. Any air leaking out of the port 32 will be dispersed laterally from the port 32 as shown by the phantom flow arrows labeled F in FIG. 2, preventing the leakage air from impinging directly against the outer casing 20. The leaking air then mixes with the bypass air 24a which safely reduces its temperature.

In the event the plug is absent from the sleeve, the leaking core air 24b is then discharged directly into the sleeve inner end 38a for flow radially outwardly through the sleeve 38 and annulus 40 radially outwardly through the outer casing 20. The sleeve 38, therefore, also provides an effective flow conduit for capturing and channeling the leaking core air 24b through the outer casing 20 for preventing direct impingement of the hot air against the inner surface of the casing 20.

Accordingly, the sleeve 38 and first and second retainers 42, 44 are effective for retaining the plug 36 against inadvertent disengagement of the plug 36 from the borescope port 32 during operation. However, during normal operation with the plug 36 maintaining engagement in the borescope port 32, the plug 36 and sleeve 38 are preferably suitably sealed to the outer casing 20 for maintaining flow integrity of the bypass duct 22, and for also accommodating differential axial, radial, and circumferential movement relative to the outer casing 20.

Figure 6:
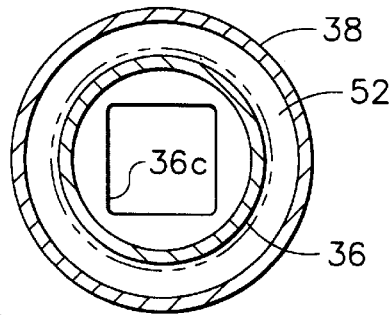
FIG. 6 is a radial sectional view through the borescope plug and surrounding sleeve illustrated in FIG. 2 and taken along line 6—6.

More specifically, and referring to FIGS. 2 and 6, the apparatus 34 preferably also includes means in the form of a first, radially inner seal 52 disposed between the sleeve 38 and plug 36 in the annulus 40 near the sleeve inner end 38a for sealing fluid flow through the sleeve 38 from the inner end 38a thereof. In the exemplary embodiment illustrated in FIG. 2, the inner seal 52 is in the form of an annular land or flange extending radially inwardly inside the sleeve 38 and formed integrally therewith. The seal land 52 extends toward the outer surface of the plug 36 to substantially close the annulus 40 locally therebetween and effects a substantially small gap to restrain or seal fluid flow between the sleeve inner and outer ends 38a,b. Since the pressure of the bypass air 24a within the bypass duct 22 is greater than the ambient pressure outside the outer casing 20, the bypass air 24a will tend to flow into the sleeve inner end 38a around the plug 36 and would leak radially outwardly through the sleeve 38 but for the seal land 52 which minimizes the leakage thereof. This simple seal also allows differential radial movement between the plug 36 and sleeve 38 during operation without mechanical restraint.

In order to seal the radially outer end of the sleeve 38 through the access port 20a in the outer casing 20, means in the form of a second, floating outer seal 54 are disposed between the sleeve outer end 38b and the outer casing 20 for sealing fluid flow therebetween. In the preferred embodiment illustrated in FIGS. 2 and 5, the outer seal 54 cooperates with the first retainer 42 for accommodating differential axial and circumferential movement between the sleeve 38 and the outer casing 20 for providing effective sealing therebetween in a floating assembly.

More specifically, the first retainer 42 preferably includes a collar, designated by prefix 56, fixedly joined around the sleeve outer end 38b. A complementary annular cap 58 surrounds the collar 56 for trapping it therein, with the cap 58 being fixedly joined to the outer casing 20 by suitable fasteners 60. The cap 58 is in the form of a tubular cup having a center aperture through which the outer ends of the plug 36 and sleeve 38 may extend. The cap 58 is fastened in contact with the outer casing 20 for providing a suitable seal therebetween. The cap 58 also captures the collar 56 in a suitably small radial clearance therebetween for providing effective sealing. The cap 58 has a suitable large diameter greater than the outer diameter of the collar 56 for allowing limited differential axial and circumferential movement therebetween while maintaining effective sealing.

The cap 58 and collar 56 assembly is directly analogous to a corresponding cap and thin seal washer used for sealing a conventional borescope plug and allowing differential movement, and could be used in such form if desired.

However, in the preferred embodiment illustrated in FIGS. 2 and 5, the collar 56 is fixedly attached to the sleeve 38, and preferably has a specific configuration for providing self-alignment with the outer casing 20. As illustrated in FIG. 1, the plug apparatus 34 for the diffuser 26 is substantially perpendicular to the outer casing 20, whereas the plug apparatus 34 for the combustor 28 is inclined relative thereto.

Accordingly, the collar 56 illustrated in FIG. 2 preferably includes two components for providing articulation or self-alignment relative to the outer casing 20. The collar 56 includes a head 56a suitably fixedly joined around the sleeve outer end 38b, and a complementary seat 56b trapped within the cap 58 for allowing relative pivoting movement between the head 56a and the seat 56b. The lip 50a may be preferably an integral portion of the inner diameter of the head 56a at the sleeve outer end 38b.

As shown in FIG. 2, the head 56a preferably includes a spherical convex portion engaging a complementary spherical concave portion of the seat 56b for allowing relative pivoting movement therebetween. The spherical head 56a therefore allows the sleeve 38 to be installed at angles other than perpendicular to the surface of the outer casing 20 while still providing effective performance. Instead of a spherical interface between the head and seat, the seat may be conical for use with a spherical head.

Correspondingly, the outer seal 54 preferably includes a first stage 54a in the exemplary form of a O-ring mounted in a flange between the head 56a and seat 56b. The outer seal 54 preferably also includes a second stage defined between the seat 56b and the cap 58. The second stage seal is simply an abutting smooth fit between the seat and the cap for sealing flow leakage therebetween while allowing differential movement. The first stage 54a seals leakage between the head and seat, and in alternate embodiments may instead include a conventional wavy washer or conical washer for providing a preload between the head 56a and seat 56b for maintaining a tight sealing fit therebetween. In this way, leakage of the bypass air 24a from the bypass duct 22 and through the access port 20a is sealed both between the head 56a and seat 56b, and between the seat 56b and the cap 58. The differential pressure acting across the outer casing 20 urges these components into abutting contact for further improving the effectiveness of the seals thereat.

The outer O-ring seal 54a not only provides effective sealing thereat, but also provides damping to minimize vibration and wear of the sleeve 38 and seat 56b. The O-ring also provides frictional resistance to the sleeve 38 preventing it from rotating when the borescope plug is being installed or removed. The flange containing the O-ring seal 54a provides a limit stop for radial and angular motion of the sleeve 38 in the event that the borescope plug 36 is loose or absent. This feature of the cooperating first retainer 42 and outer seal 54 effectively suspends the sleeve 38 in cantilever fashion which will maintain its alignment with the borescope port 32 even upon blowout of the plug 36.

Accordingly, the introduction of the sleeve 38 suitably cooperating with the plug 36 and the outer casing 20 provides for retention of the plug 36 and controlled leakage through the sleeve 38 in the event of disengagement from the borescope port 32; while permitting unrestrained differential axial, radial, and circumferential movement between the plug 36 and the outer casing 20, with effective sealing therebetween during normal engine operation with the plug 36 fully engaged in the borescope port 32.

Since the components defining the borescope plug apparatus 34 primarily cooperate with each other, the apparatus 34 may be readily retrofitted into existing engine designs without other modification thereof.

Figure 7:
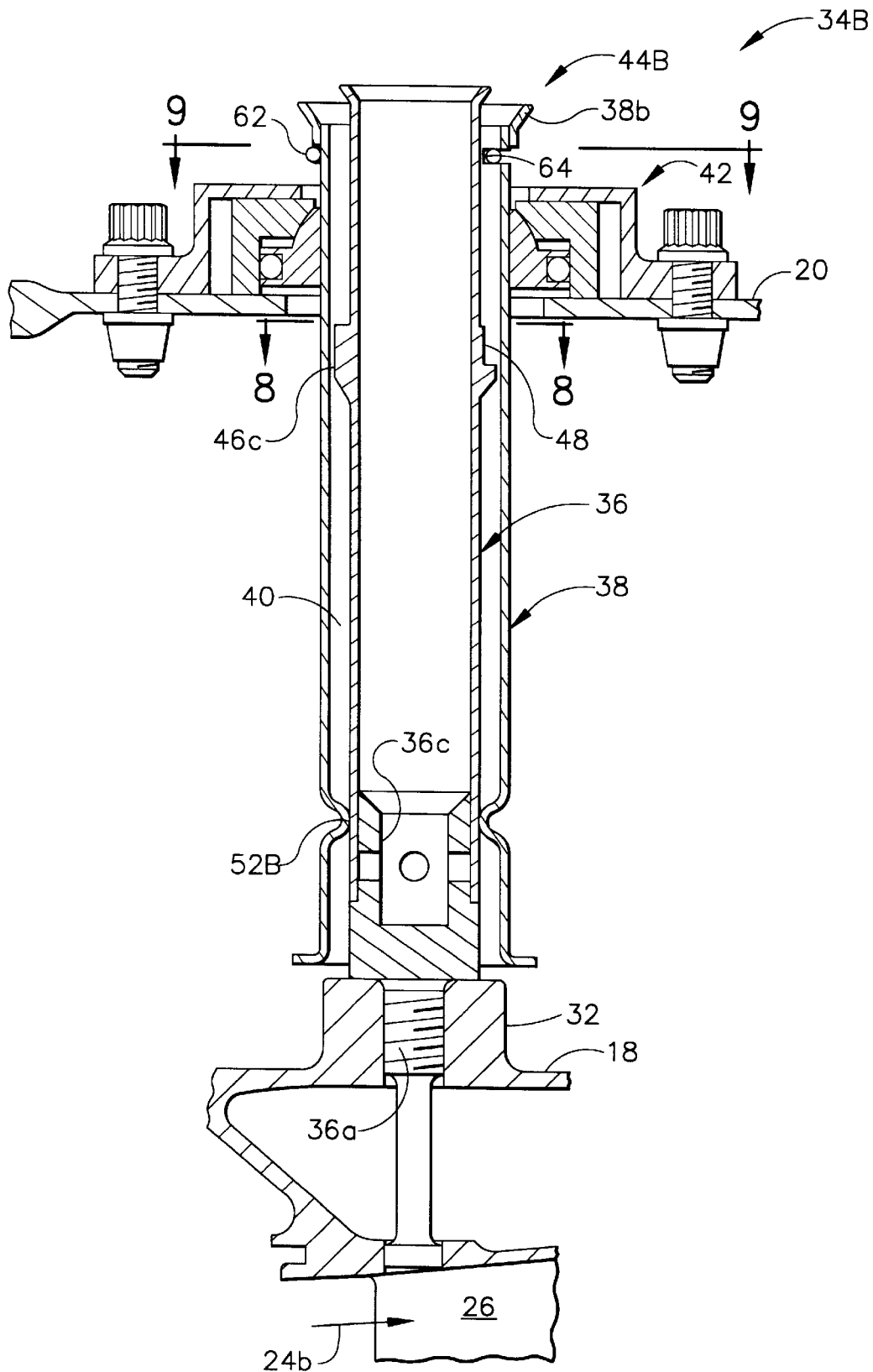
FIG. 7 is a view like FIG. 2 illustrating a borescope plug apparatus in accordance with an alternate embodiment of the present invention.

Various modifications of the plug apparatus 34 may be made within the scope of the present invention for enjoying one or more of the advantages thereof. For example, FIG. 7 illustrates an alternate embodiment of the borescope plug apparatus designated 34B which is similar in most features to the first embodiment illustrated in FIG. 2. In this embodiment, however, the inner seal 52B may, instead of being an integral extension of the sleeve 38, be formed by conventional swaging to provide a locally reduced diameter section in the sleeve 38 in close proximity to the outer surface of the plug 36. This would reduce cost of manufacture of the sleeve 38 over the machined inner seal 52 of the first embodiment illustrated in FIG. 2.

Figure 8:
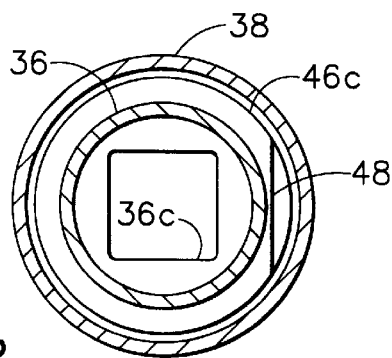
FIG. 8 is a radial sectional view of the borescope plug and surrounding sleeve illustrated in FIG. 7 and taken along line 8—8.

Instead of the two stop bands 46a,b illustrated in FIG. 2, the FIG. 7 embodiment utilizes a single, third stop band 46c for effecting a different form of the second retainer designated 44B. The third stop band 46c preferably includes a conical lower portion disposed coaxially around the borescope plug 36, at an integral annular upper portion. As shown in more particularity in FIG. 8, the upper portion of the band 46c is cylindrical except for a chordal flat 48 at one angular position thereof which defines a step above the conical lower portion. Like the first and second bands 46a,b of the first embodiment, the upper portion of the third band 46c of the second embodiment is also generally D-shaped.

Figure 9:
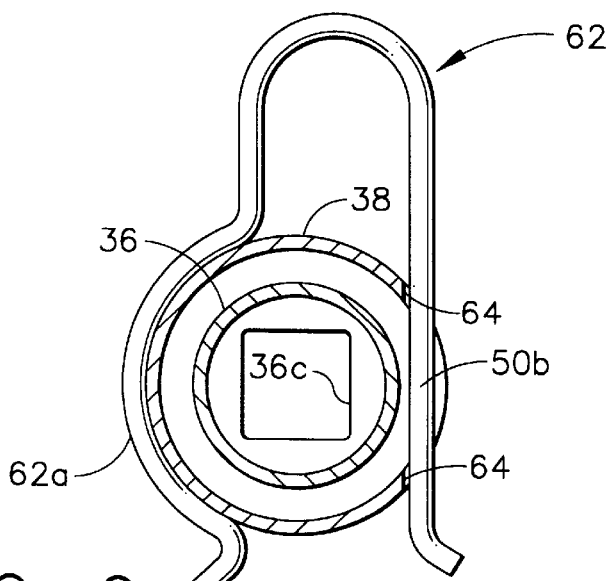
FIG. 9 is a radial sectional view of the borescope plug and surrounding sleeve illustrated in FIG. 7 and taken along line 9—9.

The second retainer 44B in the embodiment illustrated in FIGS. 7 and 9 includes a removable, generally U-shaped spring clip 62 having a substantially straight leg defining a lip 50b which extends chordally through a slot 64 on one side of the sleeve outer end 38b. The spring clip 62 includes an integral second leg 62a, as shown in FIG. 9, which is arcuate in part and complementary with the outer profile of the sleeve 38 for engaging the sleeve outer end 38b diametrically oppositely to the slot 64 therein.

The spring clip 62 provides a radial stop for preventing ejection of a loose plug 36. Upon disengagement of the plug inner end 36a from the borescope port 32, the pressure of the core air 24b will push the plug 36 radially outwardly through the sleeve 38 until the lip 50b engages any portion of the stop band 46c. Since the stop band 46c effectively closes the entire annulus 40 around the full perimeter of the plug 36, the plug 36 cannot escape from the sleeve 38.

The spring clip 62 not only provides effective retention of the plug 36 within the sleeve 38 when loose, but also allows easy assembly and disassembly. During assembly, the spring clip 62 may be initially inserted through the sleeve slot 64 and self-captured around the outer surface of the sleeve 38. The borescope plug 36 may then be installed radially inwardly through the sleeve outer end 38b until the stop band 46c contacts the lip 50b. By simply pushing the plug 36 further inwardly, the conical lower portion of the stop band 46c resiliently spreads radially outwardly the lip 50b in a cam like manner until the stop band 46c is pushed inwardly past the spring clip 62, with the lip 50b returning to its undeflected position. The plug 36 may then be conventionally threaded into engagement with the borescope port 32 to complete the assembly.

Upon disassembly, the plug 36 is unthreaded from the port 32 and manually lifted upwardly in the sleeve 38 until the stop band 46c engages the lip 50b. The plug 36 is rotated as required for aligning the flat 48 with the lip 50b so that the plug 36 may be further lifted upwardly until the lip 50b engages the bottom of the step above the conical lower portion. The plug 36 may then be rotated so that the cylindrical upper portion of the stop band 46c away from the flat 48 deflects outwardly the lip 50b in a cam-like manner which then clears the step and allows the plug 36 to be further removed from the sleeve 36 without obstruction from the lip 50b.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A borescope plug apparatus for plugging a borescope port in an inner casing spaced radially inwardly from an outer casing in a gas turbine engine, comprising:

a borescope plug having a threaded inner end for threadingly engaging said borescope port, and an opposite outer end;

a tubular sleeve surrounding said plug to define an annulus therebetween, and having opposite inner and outer open ends;

a first retainer operatively joined to said sleeve outer end for mounting said sleeve to said outer casing; and a second retainer operatively joined between said sleeve and said plug for retaining said plug inside said sleeve upon disengagement between said plug inner end and said borescope port.

2. An apparatus according to claim 1 wherein said second retainer comprises:

a band extending outwardly around said plug in said annulus; and a lip fixedly joined to said sleeve outer end, and extending inwardly into said annulus for engaging said plug band to restrain ejection of said plug through said sleeve.

3. An apparatus according to claim 2 further comprising:

an inner seal disposed between said sleeve and plug in said annulus for sealing fluid flow through said sleeve from said inner end thereof; and an outer seal disposed between said sleeve and said outer casing for sealing fluid flow therebetween.

4. An apparatus according to claim 3 wherein said inner seal comprises an annular land extending inwardly inside said sleeve toward said plug to substantially close said annulus therebetween to restrain said fluid flow between said sleeve inner and outer ends.

5. An apparatus according to claim 3 wherein said first retainer comprises:

a collar fixedly joined around said sleeve outer end; and a complementary cap trapping said collar therein, and fixedly joined to said outer casing.

6. An apparatus according to claim, 5 wherein said collar comprises:

a head joined around said sleeve outer end; and a complementary seat trapped within said cap for allowing relative pivoting movement between said head and seat.

7. An apparatus according to claim 6 wherein said head includes a spherical convex portion engaging a complementary spherical concave portion of said seat for allowing relative pivoting therebetween.

8. An apparatus according to claim 6 wherein said outer seal comprises a first stage defined between said head and seat, and a second stage defined between said seat and cap.

9. An apparatus according to claim 5 wherein said second retainer further comprises:

first and second spaced apart ones of said bands, each being annular, with a respective chordal flat at different positions; and said lip is complementary to said chordal flats for allowing passage of said plug therepast when aligned therewith, and obstructing passage thereof when unaligned therewith.

10. An apparatus according to claim 5 wherein said second retainer further comprises:

said band having a conical lower portion and an annular upper portion with a chordal flat at one position therein; and a spring clip having said lip as a first substantially straight leg thereof extending through a slot in said sleeve outer end, and a second leg arcuate in part for engaging said sleeve outer end opposite to said slot therein.

* * * * *